(12) United States Patent
Ilstad et al.

(10) Patent No.: US 11,287,062 B2
(45) Date of Patent: Mar. 29, 2022

(54) INTERCONNECTION OF SUBSEA PIPELINES AND STRUCTURES

(71) Applicant: Equinor Energy AS, Stavanger (NO)

(72) Inventors: Håvar Ilstad, Trondheim (NO); Erik Levold, Trondheim (NO)

(73) Assignee: Equinor Energy AS, Stavanger (NO)

( * ) Notice: Subject to any disclaimer, the term of this patent is extended or adjusted under 35 U.S.C. 154(b) by 0 days.

(21) Appl. No.: 16/955,570

(22) PCT Filed: Jun. 15, 2018

(86) PCT No.: PCT/NO2018/050162
§ 371 (c)(1),
(2) Date: Jun. 18, 2020

(87) PCT Pub. No.: WO2019/125174
PCT Pub. Date: Jun. 27, 2019

(65) Prior Publication Data
US 2020/0318759 A1 Oct. 8, 2020

(30) Foreign Application Priority Data
Dec. 22, 2017 (GB) .................................... 1721777

(51) Int. Cl.
*F16L 1/26* (2006.01)
*E21B 43/01* (2006.01)
(Continued)

(52) U.S. Cl.
CPC .............. *F16L 1/26* (2013.01); *E21B 43/013* (2013.01); *E21B 43/0107* (2013.01); *F16L 1/19* (2013.01)

(58) Field of Classification Search
CPC ........... F16L 1/26; F16L 1/19; E21B 43/0107; E21B 43/013
See application file for complete search history.

(56) References Cited

U.S. PATENT DOCUMENTS 3,766,743 A * 10/1973 Brown ................ E21B 43/0107
405/169
5,074,713 A * 12/1991 Salvi dos Reis ....... E21B 41/04
405/169
(Continued)

FOREIGN PATENT DOCUMENTS

EA 200800287 A1 6/2008
EA 023126 B1 4/2016
(Continued)

OTHER PUBLICATIONS

Aug. 28, 2018—(WO) International Search Report and Written Opinion—App PCT/NO2018/050162.
(Continued)

*Primary Examiner* — Sean D Andrish
(74) *Attorney, Agent, or Firm* — Banner & Witcoff, Ltd.

(57) ABSTRACT

There is provided a method of interconnecting a conduit and a plurality of subsea structures. The method comprises providing a first manifold header in-line of the conduit, where the first manifold header has at least one valve installed therein, A portion of the conduit is lowered to the sea bed such that the first manifold header is engaged with a first subsea structure, and a further portion of the conduit is lowered to the sea bed. A second manifold header, having at least one valve installed therein, is provided in-line of the conduit and engaged with a second subsea structure. The length of conduit provided on the sea bed between the first subsea structure and the second subsea structure is significantly greater than the distance between the first and second subsea structures.

21 Claims, 17 Drawing Sheets

(51) Int. Cl.
*E21B 43/013* (2006.01)
*F16L 1/19* (2006.01)

(56) References Cited

U.S. PATENT DOCUMENTS

| | | | | |
|---|---|---|---|---|
| 5,320,175 | A | * | 6/1994 | Ritter .................... E21B 43/013 166/339 |
| 6,148,921 | A | | 11/2000 | Valla et al. |
| 7,600,569 | B2 | * | 10/2009 | Routeau .............. E21B 43/0135 166/344 |
| 8,562,255 | B2 | * | 10/2013 | Persson .................. F16L 57/02 405/168.1 |
| 9,068,675 | B2 | * | 6/2015 | Mille ........................ F16L 1/18 |
| 2017/0108143 | A1 | * | 4/2017 | Moen ........................ F16L 1/16 |

FOREIGN PATENT DOCUMENTS

| | | |
|---|---|---|
| GB | 2509167 A | 6/2014 |
| GB | 2545683 A | 6/2017 |
| RU | 2381134 C2 | 2/2010 |
| RU | 2583028 C2 | 4/2016 |
| WO | 02057674 A1 | 7/2002 |
| WO | 2015149843 A1 | 10/2015 |
| WO | 2017146582 A1 | 8/2017 |
| WO | 2018111120 A1 | 6/2018 |

OTHER PUBLICATIONS

Apr. 23, 2018—(GB) Search Report—App 1721777.9.
May 25, 2018—(GB) Search Report—App 1721777.9.
Per R. Nystrøm et al., Lay Method to Allow for Direct Tie-in of Pipelines, International Society of Offshore and Polar Engineers, presented at the Twenty-fifth International Ocean and Polar Engineering Conference, Jun. 21-26, 2015, Kona, Hawaii, USA.
Sep. 7, 2021 (RU)—Office Action & Search Report Application No. 2020124108/03(041628).

* cited by examiner

INTERCONNECTION OF SUBSEA PIPELINES AND STRUCTURES

The present application is a U.S. National Phase of International Application No. PCT/N02018/050162, filed on Jun. 15, 2018, designating the United States of America, and claims priority to British Patent Application No. 1721777.9, filed on Dec. 22, 2017. This application claims priority to and the benefit of the above-identified applications, which are fully incorporated by reference herein in their entirety.

The invention it relates to a method of laying a subsea pipeline and interconnecting and/or tying it in to one or a plurality of subsea structures. It also extends to a corresponding arrangement of pipeline and subsea structure(s). The subsea pipelines may in particular be hydrocarbon pipelines used in the oil and gas industry.

Pipelines for an oil and gas subsea installation, such as those used for the transport of hydrocarbons, e.g. oil or gas, are typically laid along the seabed between subsea structures using a pipeline-laying vessel at the surface. Each subsea structure will typically comprise one or more "Xmas trees" (or riser bases or Blow-Out Preventers (BOPs)) each mounted on a well head, with a manifold typically provided between the Xmas trees and the pipeline.

Often, one or both ends of the pipeline are connected (or "tied-in") to a manifold of the subsea structure using a separate jumper or spool. Existing subsea manifolds are generally designed for four well heads and weigh typically 150-200 tons. The spools may be rigid or flexible and are designed to take up installation tolerances, tie-in forces and pipeline expansion.

Direct tie-in methods (without a jumper or spool) can also be used. These methods include:

Direct pull-in, in which an end of the pipeline is pulled close to the subsea structure using a winch location on the laying vessel, and the tie-in is completed using a remotely operated vehicle (ROV) and alignment apparatus;

Deflect to connect, wherein the pipe is pulled to a target area in line with the platform but to one side of it, then the connection is made by winding or otherwise deflecting the pipe laterally until it mates with the riser connection; and Connect and lay-away, in which the subsea end of the pipeline is connected to the subsea structure at the surface, and the subsea structure is then lowered to the seabed before the laying vessel lays the pipeline by stepping away from the subsea structure.

However, all of these methods of connecting a pipeline to a subsea facility require considerable time, effort and cost, with many underwater connections to be made. The extra components and procedures associated with the use of separate jumpers or spools in particular can result in high costs for the installation process. For example, a number of lifting procedures may be required where a spool is used: firstly, a lift to install the foundation structure, secondly, a lift to install the manifold and thirdly, a lift to install the spool. The spool then needs to be connected to the manifold by an ROV connection process.

Partly in order to address these issues the applicants have developed a method of interconnecting a pipeline to a subsea structure based upon installing a header pipe joint (otherwise referred to as a manifold header) at a subsea structure. The method comprises providing a header pipe joint having at least one valve installed therein; connecting the header pipe joint inline of a spool or pipeline prior to lowering the header pipe joint to the subsea structure; lowering the header pipe joint to the subsea structure; and connecting the valve to the subsea structure with a connection bridge to provide fluidic connection between the subsea structure and the header pipe joint. This method is the subject of the applicant's co-pending patent application PCT/NO2017/050331, which is incorporated herein by reference, but which was not published at the filing date hereof.

That application also discloses-a method of installing a header pipe joint at a subsea structure, comprising: providing a header pipe joint having at least one valve installed therein; connecting the header pipe joint inline of a spool or pipeline prior to lowering the header pipe joint to the subsea structure; lowering the header pipe joint to the subsea structure; connecting the valve to the subsea structure with a connection bridge to provide fluidic connection between the subsea structure and the header pipe joint; wherein the subsea structure comprises a foundation which provides support for both a wellhead and the header pipe joint.

It will be appreciated that these methods have the advantage of greatly simplifying the interconnection process and enabling additional steps to be performed at the surface, rather than sub-sea. However, whilst the pipeline is connected to the header pipe or manifold header at the surface, it is still necessary to manipulate that assembly relative to the subsea structure and to do that, it is necessary to move the pipeline to some extent relative to the subsea structure. The inventors have recognised that it is possible to locate the manifold header to within +/−1 meter of the desired location, so only that relatively small degree of movement must be provided.

Various techniques are known for providing the necessary flexibility to accommodate tolerances in the lengths of pipelines that have to be connected to subsea structures. For example, rigid spools may be arranged in an L- or Z-shaped formation which inherently provides a degree of flexibility because the L or Z is able to deform to some extent. However, this results in a more complex structure and it cannot readily be applied in the above context. Alternatively, a flexible spool, jumper or tail may be used, though such conduits are known to have a reduced life time compared to rigid pipe systems. Again, this approach is not readily applicable to the above-described methods.

The paper *Lay Method to Allow for Direct Tie-in of Pipelines* by Per R. Nyström, Geir Endal, and Odd M. Lyngsaunet, International Society of Offshore and Polar Engineers, (presented at the Twenty-fifth International Ocean and Polar Engineering Conference, 21-26 Jun. 2015, Kona, Hi., USA) discusses known tie-in methods for interconnecting pipelines to subsea structures and proposes creating a section of curved pipeline close to the subsea structure. In particular, it proposes taking doing this by means of "residual curvature". The conventional way to install pipeline from a surface vessel is for it to be stored on a reel aboard the vessel and unwound and straightened as it is used by means of a straightener located at the aft part of the vessel. The straightened pipeline is then lowered from the stem of the vessel. By selectively disabling the straightener, sections of non-straightened pipeline (i.e. having residual curvature, "RC") may be lowered to the sea bed. The paper teaches that the RC section should be located close to the subsea structure, which it defines as about 50-100 meters away, with a straight section in between. The paper also teaches the use of a wire tensioning system to maintain the form of the RC section.

The same system is also the subject of the applicant's earlier patent application WO 2015/149843.

The inventors have recognised that the method of the Nystrom paper may be applied, if suitably modified, to systems such as that of the applicant's earlier (unpublished) application PCT/NO2017/050331.

Thus, viewed from a first aspect, the present invention provides a method of interconnecting a conduit and a plurality of subsea structures comprising: providing a first manifold header in-line of the conduit, the first manifold header header comprising at least one valve installed therein; lowering a portion of the conduit to the sea bed such that the first manifold header is engaged with a first subsea structure; lowering a further portion of the conduit to the sea bed and providing a second manifold header in-line of the conduit, the second manifold header comprising at least one valve installed therein; engaging the second manifold header with a second subsea structure; wherein the length of conduit provided on the sea bed between the first subsea structure and the second subsea structure is significantly greater than the distance between the first and second subsea structures.

Thus, a degree of curvature is deliberately introduced into the conduit. This allows for ready adjustment of the axial position of the manifold header relative to the subsea structure. The degree and location of the curvature may be selected in accordance with the particular project. However, the length of the conduit is preferably such that at least +/−0.5 m and preferably at least +/−1 m of axial adjustment of the manifold header relative to the subsea structure is enabled.

The invention may be used in virtually any depth of water where such conduits etc. are employed, for example, from as shallow as 50 metres to as deep as 400 metres.

The inventors have also recognised that, where a manifold header is being used, it is important that it should not be subjected to torsional forces that might cause problems during its installation, e.g. by twisting it from its proper orientation. Since the presence of curved sections of conduit will have a tendency to twist, the length of conduit between the first subsea structure and the second subsea structure preferably comprises first and second straight sections and curved section between the straight sections. Thus, the straight sections preferably allow the curved part to "settle" on the sea bed before the manifold header is connected inline. It will be appreciated that this is quite the opposite of the teaching of the Nystrom paper cited above.

The pipeline will be in the form of a catenary as it is lowered (e.g. from a pipe-laying vessel) and the inventors have found that accordingly, the straight sections have a length that is significantly greater than the water depth, e.g. at least twice or preferably at least three times the water depth. This ensures that there is a sufficient length of straight pipe on the sea bed before the manifold header is connected inline, typically by welding. In any event, the straight sections are preferably at least 150 metres in length and given typical water depths, usually much longer than this.

A number of approaches may be used to provide the necessary curvature. Thus, a residual curvature section (as described above) may be provided in the conduit between the first and second subsea structures. In other words, a portion of the conduit may be plastically deformed before it is lowered to the sea bed as a result of not removing curvature caused by storing it on a reel. A plurality, and preferably three, residual curvature sections may be provided.

Alternatively, a curved section of pipe is laid on the seabed, for example by adjusting the course of the pipe-laying vessel. Additionally or alternatively, counteracts (i.e. reaction surfaces) may be provided on the sea bed around which the section of pipe is curved. These may then be removed to allow the radius of the curve to be reduced to enable axial adjustment at the seabed structure.

In a further alternative, the conduit may be curved in the vertical direction, preferably by lifting it from the surface or by laying it across a subsea structure or raised object.

Accordingly, the method may further comprise axially adjusting the position of the manifold header before securing it in position. Typically, by engaging the first and/or second manifold header with the respective subsea structure a secure mechanical connection is formed with the subsea structure preventing significant relative movement therebetween. The step of engaging the first and/or second manifold header may comprise the use of an alignment mechanism to guide the manifold header into the proper location as it is lowered. For example, it could involve the engagement of a conical or wedge-shaped portion thereof with a V-shaped or tapered cradle.

Once the manifold header is secured in place, the method may further comprise the step of fluidly connecting the valve of the manifold header with the subsea structure. Thus, the manifold header may be both mechanically and fluidly connected to the subsea structure.

It will be appreciated that the invention is most likely to be applied to hydrocarbon extraction and so the conduit may be a subsea pipeline or subsea spool, (or a flexible pipeline or jumper) preferably for such purpose.

It will be appreciated that there a two main types of pipeline known in the art, these are rigid pipelines and flexible pipelines. A rigid pipeline typically comprises an external sheath of insulation having a corrosion resistant coating, surrounding a product pipe. The product pipe may be a metal pipe, typically of stainless steel or carbon steel. Although such pipelines are known as rigid pipelines, it will be appreciated that they are not entirely rigid. They will generally have a small amount of elastic flexibility, so that they can flex a certain amount, but if pushed to flex beyond this then the pipeline would be damaged, e.g. kink or fracture. In contrast, flexible pipelines typically comprise a number of flexible layers. These may comprise an outer corrosion resistant sheath, various armoured layers and insulating layers, whilst the innermost layer may comprise a carcass, typically of stainless steel. Each of these layers has a degree of flexibility so that the entire pipeline is flexible. The flexible layers may e.g. be corrugated or spiral formed, to provide the flexibility. Flexible pipelines may also be called hoses.

The invention is particularly applicable for use with rigid pipelines. Consequently, the conduit may be a rigid pipeline.

Likewise, the subsea structure preferably comprises a wellhead to which the valve of the manifold header may be connected.

The manifold header may, of course, comprise a plurality of such valves and accordingly, the method may further comprise interconnecting them all. This may be done by means of a choke bridge or other suitable interconnection. The manifold may comprise one single- or multi-bore connector.

The wellhead may be mounted on any convenient form of foundation, but the invention is particularly applicable when the subsea structure is a suction anchor.

As noted above, the invention may be particularly useful in combination with the invention that is the subject of the applicant's earlier unpublished application PCT/NO2017/050331. Accordingly, viewed from another aspect, the invention provides a method of interconnecting a header pipe joint (or manifold header) at a subsea structure comprising: providing a header pipe joint having at least one valve installed therein; connecting the header pipe joint inline of a spool, pipeline, flexible pipeline or jumper prior to lowering the header pipe joint to the subsea structure; lowering the header pipe joint to the subsea structure; and connecting the valve to the subsea structure with a connection bridge to provide fluidic connection between the subsea structure and the header pipe joint; wherein the spool, pipeline, flexible pipeline or jumper prior is provided with a curved section to enable axial adjustment of the header pipe joint relative to the subsea structure.

This aspect of the invention is preferably performed in combination with any or the previously described preferred features of the invention. In particular, the length of the conduit is preferably such that at least +/−0.5 m and more preferably at least +/−1 m of axial adjustment of the manifold header relative to the subsea structure is enabled. Likewise, a straight portion of pipeline preferably extends at least 150 metres between the subsea structure and the curved section. Preferably, adjustment for vertical- or horizontal of the valve providing fluidic connection to the wellhead is also enabled.

Although it is preferred for the curved section to be laid on the sea bed before the next manifold header is connected inline, this may not be possible in great depths of water. Thus, in certain embodiments, a plurality of inline manifold headers and curved sections (which may involve RC sections and/or tensioners may exist along the pipeline as it is laid from the seabed and up the pipe-laying vessel.

The invention also extends to a corresponding system of sea-bed components. Accordingly, viewed from a still further aspect there is provided a subsea system comprising a conduit at the seabed and a plurality of subsea structures comprising: a first manifold header in-line of the conduit, the first manifold header comprising at least one valve installed therein and being engaged with a first subsea structure; a second manifold header comprising at least one valve installed therein and being engaged with a second subsea structure; wherein the length of conduit provided on the sea bed between the first subsea structure and the second subsea structure is significantly greater than the distance between the first and second subsea structures.

The system is preferably installed by the method discussed above and has the corresponding preferred features.

An embodiment of the invention will be described, by way of example only, and with reference to the following drawings in which.

Where "pipeline" is referred to in the embodiments described below, it is meant a pipeline known to those skilled in this technical field as a "rigid pipeline". Such a rigid pipeline 70 typically comprises an external sheath of insulation having a corrosion resistant coating, surrounding a product pipe. The product pipe is generally a metal pipe, typically of stainless steel or carbon steel. Such rigid pipelines are typically manufactured in 12 m sections (pipe lengths), which are welded together. Although such pipelines are known as rigid pipelines, the skilled person would well appreciate that they are not entirely rigid. They will generally have a small amount of elastic flexibility, so that they can flex a certain amount (as will be discussed below), but if pushed to flex beyond this then the pipeline would be damaged, e.g. kink or fracture.

Such a rigid pipeline is to be contrasted with pipelines known as flexible pipelines. These typically comprise a number of flexible layers. These may comprise an outer corrosion resistant sheath, various armoured layers and insulating layers, whilst the innermost layer will comprise a carcass, typically of stainless steel. Each of these layers has a degree of flexibility so that the entire pipeline is flexible. The flexible layers may e.g. be corrugated or spiral formed, to provide the flexibility. It will be well appreciated that such a flexible pipeline is much more complex than the rigid pipeline since the multiple layers are required to provide the flexibility. Thus, flexible pipeline is much more expensive and complex to manufacture. It is also less strong and less robust that rigid pipeline, has more leak points, and is less resistant to ageing, temperature and pressure. It has to be manufactured at its complete length, it cannot be made in sections and welded together in the way that rigid pipelines can be. Flexible pipelines may also be called hoses.

Consequently, rigid pipelines are much preferred in embodiments of the present application, but flexible pipelines may be employed.

Figure 1:
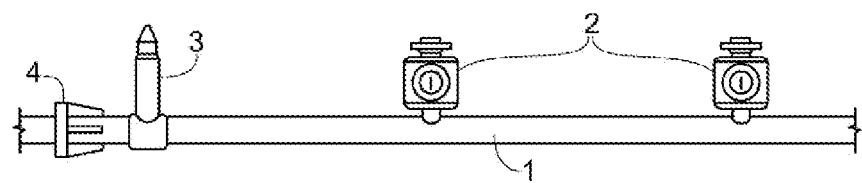
FIG. 1 is a side view of a manifold header having valves installed therein, according to a first design for use in the invention.
Figure 2:
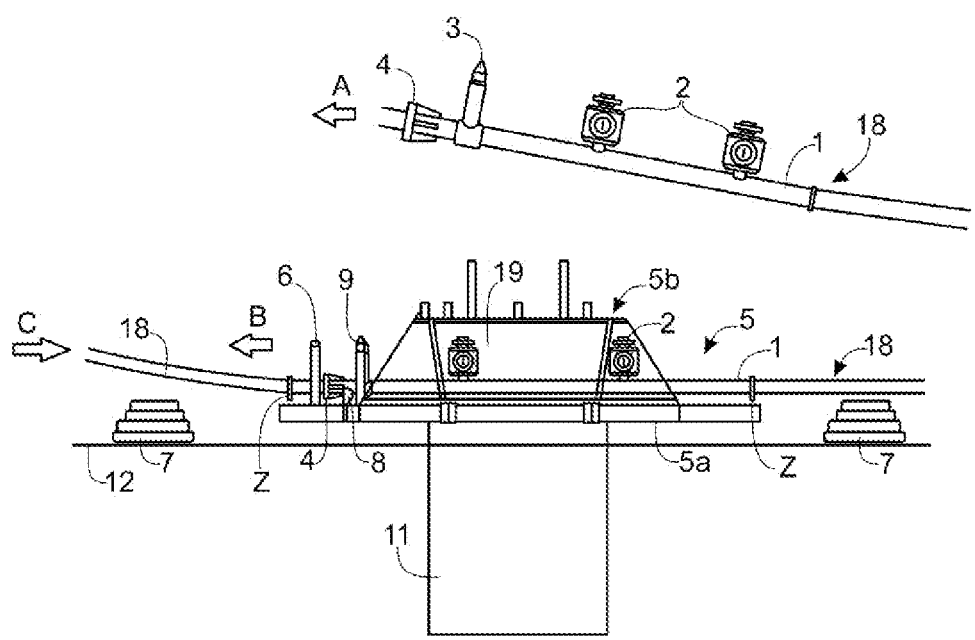
FIG. 2 illustrates the laying of a pipeline having the manifold header of FIG. 1 at a subsea structure.
Figure 3:
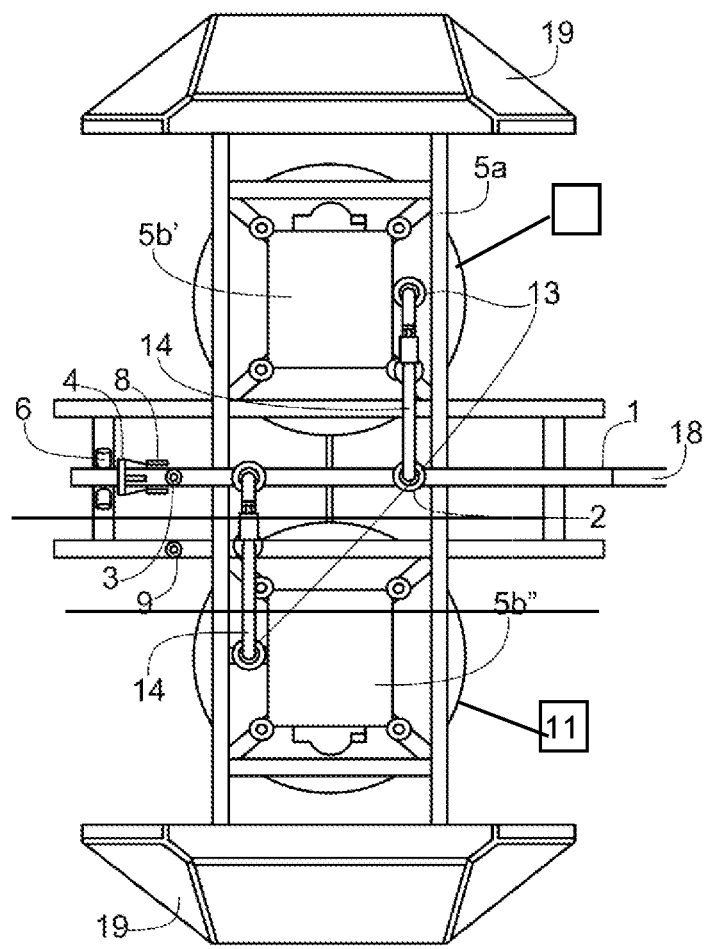
FIG. 3 is a simplified plan view of a first design of subsea structure having a manifold header laid thereat after the installation of a choke bridge between the manifold header and each of the two Xmas trees.

FIGS. 1 to 3 relate to a method of installation of a first design of subsea manifold header 1 at a subsea structure 5, which may be performed according to the invention.

Referring to FIG. 1, a manifold header 1 (also known as a manifold header) 1 is provided having two valves 2 installed therein. With reference to FIG. 2, the subsea structure 5 comprises a support structure 5a (a support frame), two Xmas trees 5b, and a foundation on which the support structure 5a is mounted and which provides support for a wellhead (not shown).

In this embodiment the foundation is in the form of two suction anchors 11 on which the support structure 5a is mounted, but in other embodiments the foundation may be a mudmat or a piled arrangement.

In other embodiments, subsea structures may comprise different numbers of Xmas trees, or indeed subsea production systems other than Xmas trees such as riser bases, pumps and compressor stations.

Each valve 2 in the manifold header 1 has a connector for fluidly connecting to a Xmas tree 5b of the subsea structure 5. The two valves 2 are spaced according to pre-determined hook-up points, which in this embodiment are wing connection hubs 13, on the Xmas trees 5b. The manifold header 1 with the two valves 2 may be tested and interface checks performed at a fabrication/mobilisation site prior to shipment to check that the manifold header will fit with the structure as intended. An anchor post 3 and axial ram plate 4 are also attached to the manifold header 1 at the fabrication site prior to shipment.

The manifold header 1 is installed (integrated) inline of a rigid pipeline 18 on a lay vessel (see later figures), i.e. above the surface and not sub-sea, e.g. by welding or bolting. The manifold header 1 is installed inline of and in between two pipeline sections forming pipeline 18. It could therefore be considered that the manifold header 1 is inline of two separate pipelines, but for simplicity this description will refer collectively to pipeline 18.

FIG. 2 illustrates the laying of the pipeline 18 having the manifold header 1 installed therein, into the support structure 5a of the subsea structure 5. It will be appreciated that the foundation (i.e. the suction anchors 11) and the support structure 5a have been pre-installed at the sea bed prior to laying of the pipeline 18.

The subsea structure 5 includes two side protection covers 19 (both visible in FIG. 4), and a top protection cover (omitted from the drawings). Reference numeral 12 denotes the sea floor.

In the upper part of the figure the pipeline 18 is shown descending towards the subsea structure 5, being pulled in the direction of arrow A. The lower part of the figure shows the pipeline 18 being guided and pulled into the subsea structure 5 in the direction of arrow B. Lines Z indicate the joins between the manifold header 1 and the pipeline 18.

An anchor post 9, alignment frame 6 and latching mechanism 8 are mounted on support structure Sa. The alignment frame 6 provides initial lateral guiding of the pipeline 18 as well as axial positioning due to interaction between the alignment frame 6 and the axial ram plate 4. The interaction occurs when the pipeline 18 is pulled by the lay vessel until the ram plate 4 comes to rest when rammed up against the alignment frame 6. The latching mechanism 8 is then activated to ensure locking in the axial direction.

In the figure, the anchor post 9, alignment frame 6 and latching mechanism 8 are located on the side of the subsea structure which receives the manifold header last. The anchor post 3 of the manifold header is similarly located on the side of the manifold header which is to be received at the structure last. Thus, considering FIG. 2, manifold header will be received by the right side of the subsea structure first, then gradually laid down and received at the left side of the structure afterwards. In other embodiments the anchor post 8, alignment frame 6 and latching mechanism 8 could be located on the other side of the subsea structure, i.e. the side which receives the manifold header first (the right side of FIG. 2). The manifold header would then also have the anchor post 3 located on the side to be received at the structure first.

Concrete inflatable support bags 7 are provided forward and aft of the subsea structure 5. These enable the pitch angle of the pipeline 18 to be controlled. In other embodiments, gravel bags, rock heaps/dumps or a frame structure may be used for a similar purpose.

In order to perform final adjustment of yaw and roll, a retrievable alignment tool (not shown) is installed onto the anchor post 9. It is then hooked up to the anchor post 3 on the manifold header. Roll and yaw can be adjusted.

Once the pipeline 18 having manifold header 1 installed therein is aligned with and locked relative to wing connection hubs on the Xmas trees 5b, two choke bridges 14 are lowered in place by a rig or construction vessel to provide the configuration shown in FIG. 3. One end of the choke bridge 14 is connected to the Xmas tree 5b' at wing connection hub 13, and the other end of the choke bridge 14 is connected to a valve 2 in the manifold header 1. Thus, the pipeline 18 is fluidly connected to the well by means of the choke bridge 14. Another choke bridge 14 is provided to connect the other Xmas tree 5b" with the other valve 2 in the manifold header 1.

The subsea structure 5 comprises wellheads (not shown) on which the Xmas trees 5b are mounted. The wellheads 40 are mounted in the suction anchors 11. Therefore, since the Xmas trees are mounted to the suction anchors 11 via wellheads, and the support frame Sa is mounted to the suction anchors, the manifold header 1 is locked in position relative to the Xmas tree to which it is connected via connection bridge 14.

Choke bridges are well known in the art and so will not be described further here. Whilst a choke bridge is used in the illustrated embodiments, the skilled person would appreciate that other connection bridges may be used, for example a bridge without a choke, a spool piece or a jumper. A choke valve may be provided separately to the bridge.

Figure 4:
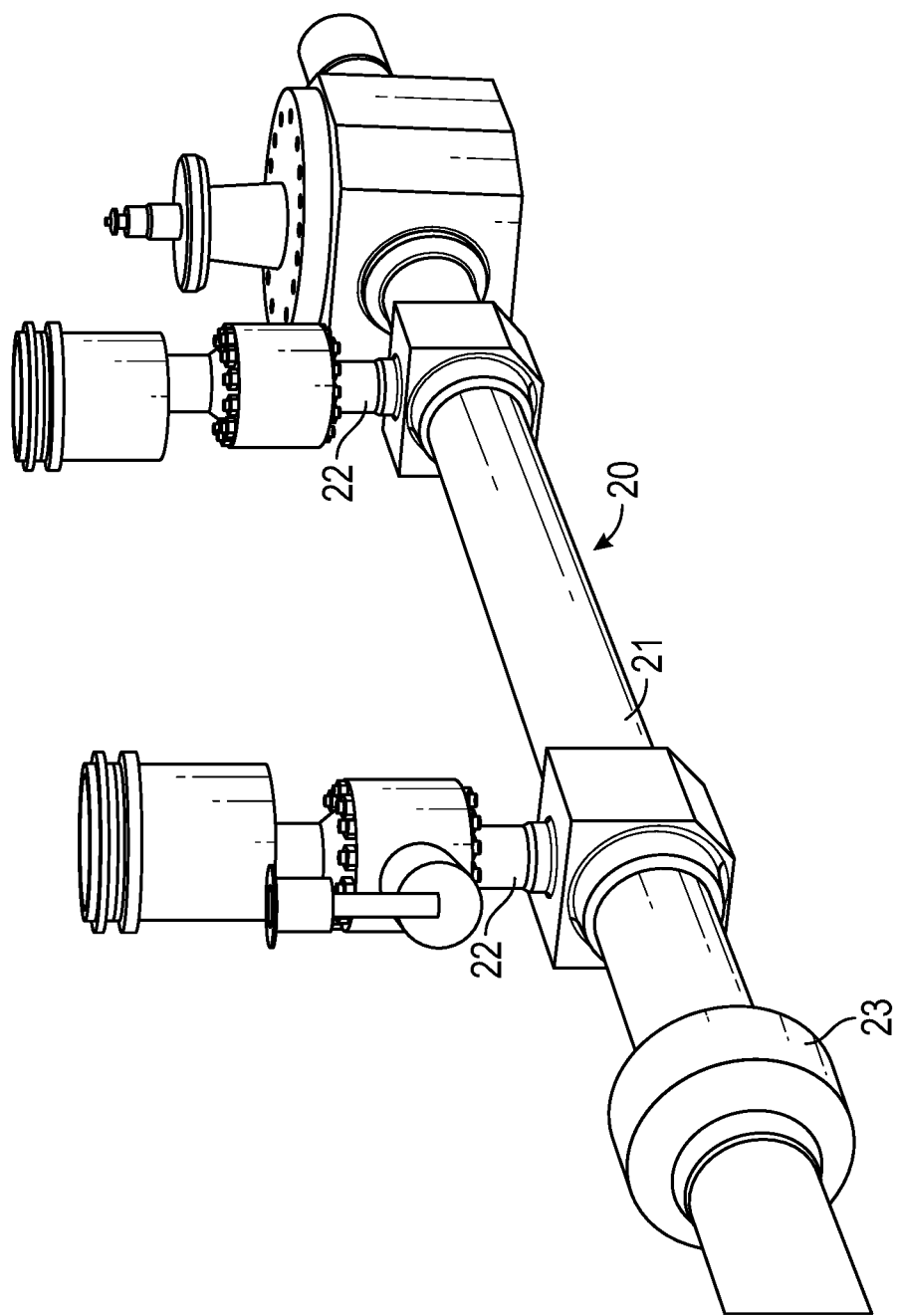
FIG. 4 is a perspective view of a manifold header having valves installed therein, according to a second design for use in the invention.

Turning now to FIG. 4, there is shown an alternative design of manifold header assembly comprising a manifold header 21 having valves 22 arranged in a similar way to those of manifold header 1. However, instead of anchor post 3 and ram plate 4, there is provided a conical-faced forging 23.

Figure 5:
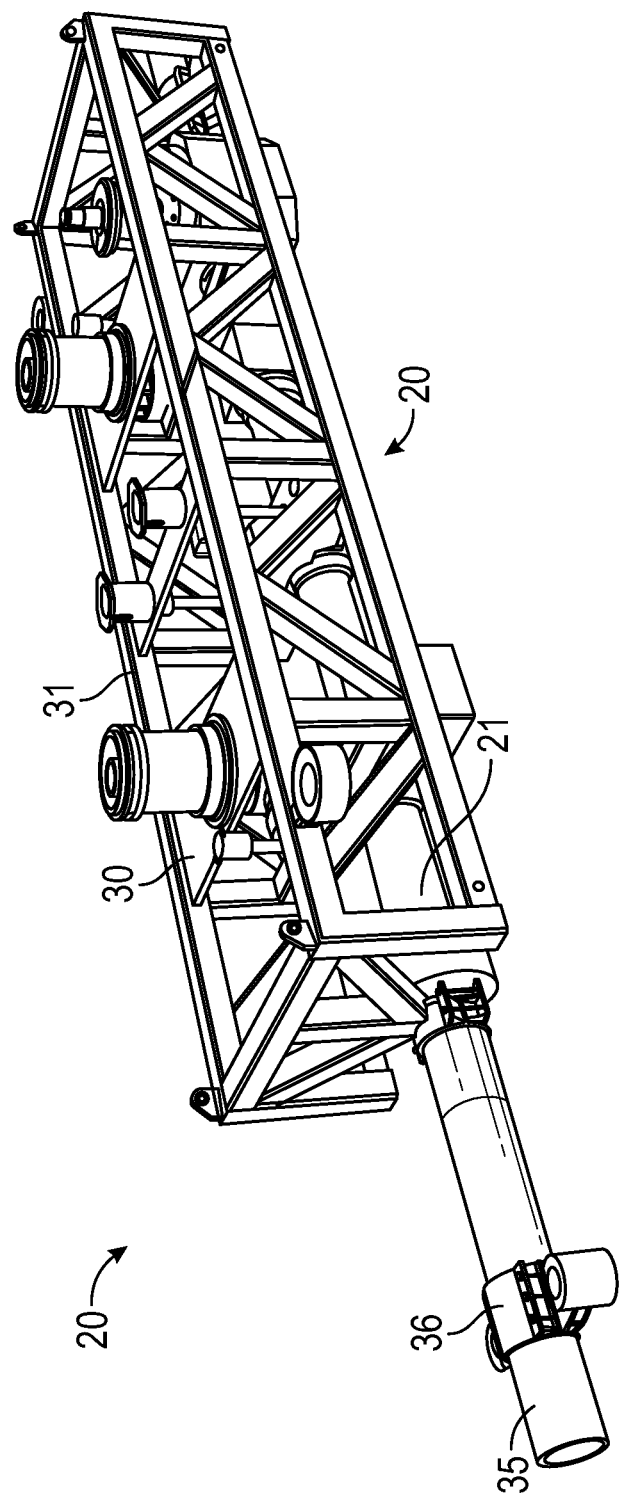
FIG. 5 is a perspective view of the manifold header of FIG. 4 incorporated into a support frame.

As shown in FIG. 5, the manifold header assembly is provided with a support frame 30 formed of a network of beams 31. This engages and partly surrounds the manifold header 21, valves 22 and forging 23. It provides rigidity and is used to assist in the location of the manifold header assembly on a subsea structure, as will be discussed below. There is also shown a portion of the pipeline 35 to which the manifold header 21 is attached and attachment clamp assembly 36, which passes around the pipeline.

Figure 6:
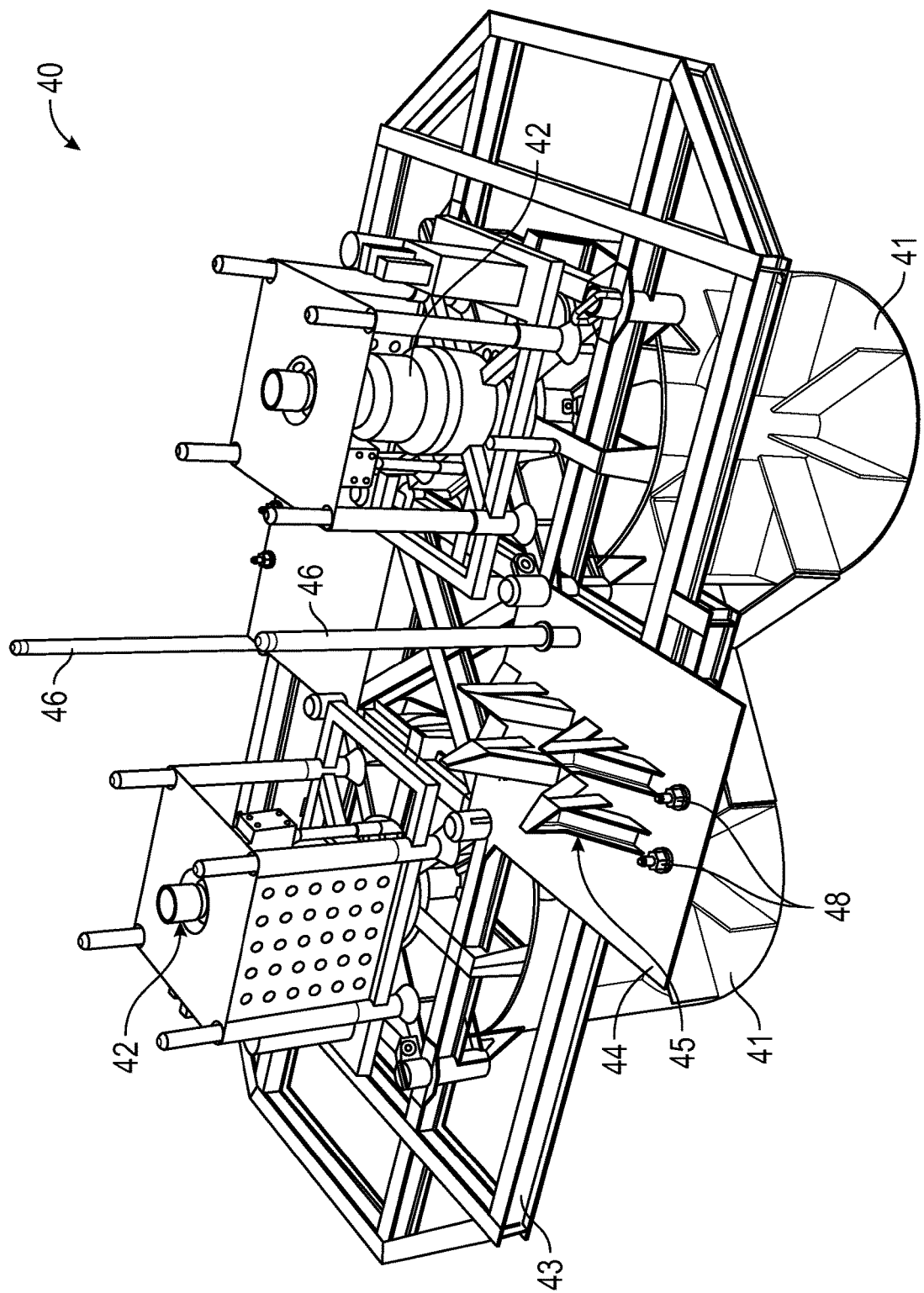
FIG. 6 is a perspective view of a second design of subsea structure for use with the manifold header of FIG. 4.

FIG. 6 illustrates subsea structure 40, which is a foundation comprising dual suction anchors 41. These are interconnected by frame 43 to provide a connecting matrix on which planar landing surface 44 is provided. Each of the suction anchors have mounted to it a wellhead assembly 42, comprising a wellhead, Xmas tree, etc., as is well known in the art.

The landing surface 44 is provided with an engagement cradle 45 and two alignment posts 46 which together facilitate the engagement and interconnection of manifold header assembly 20. Engagement pins 48 are also provided to mate with clamp assembly 36.

Figure 7:
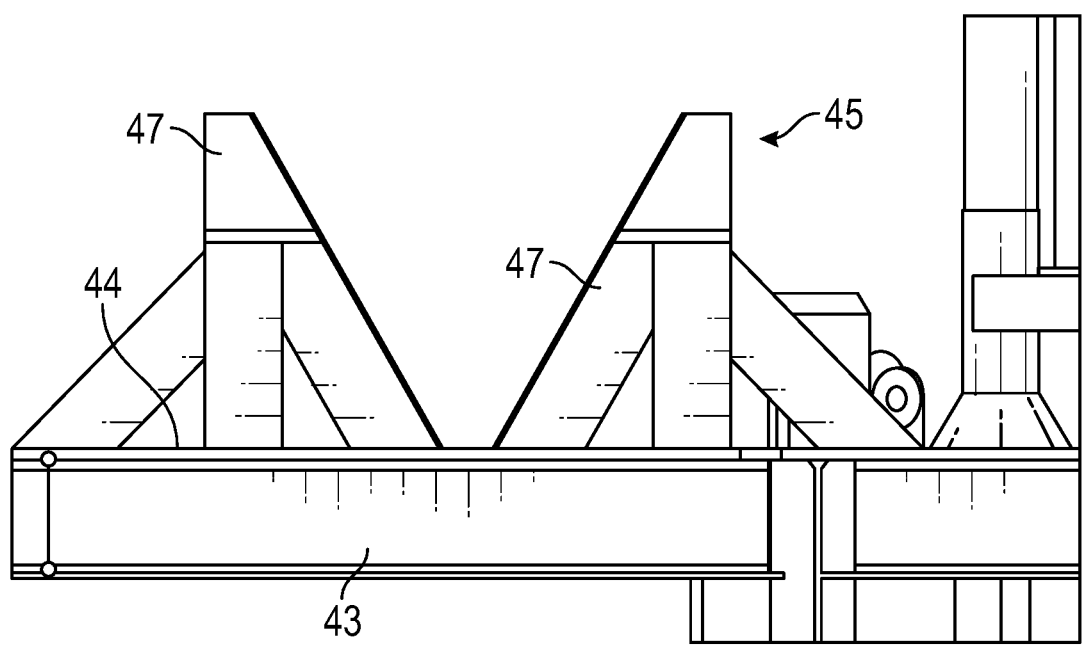
FIG. 7 is an enlarged elevation of the manifold header engagement system of the structure of FIG. 6.

The engagement cradle 45 is shown in more detail in FIG. 7. It comprises a pair of V-shaped jaws (one of which is visible in this figure) each formed by a pair of angled beams, which are secured to the landing surface 44 on frame 43. These serve to engage with the conical faces of forging 23 as will be described below.

Figure 8:
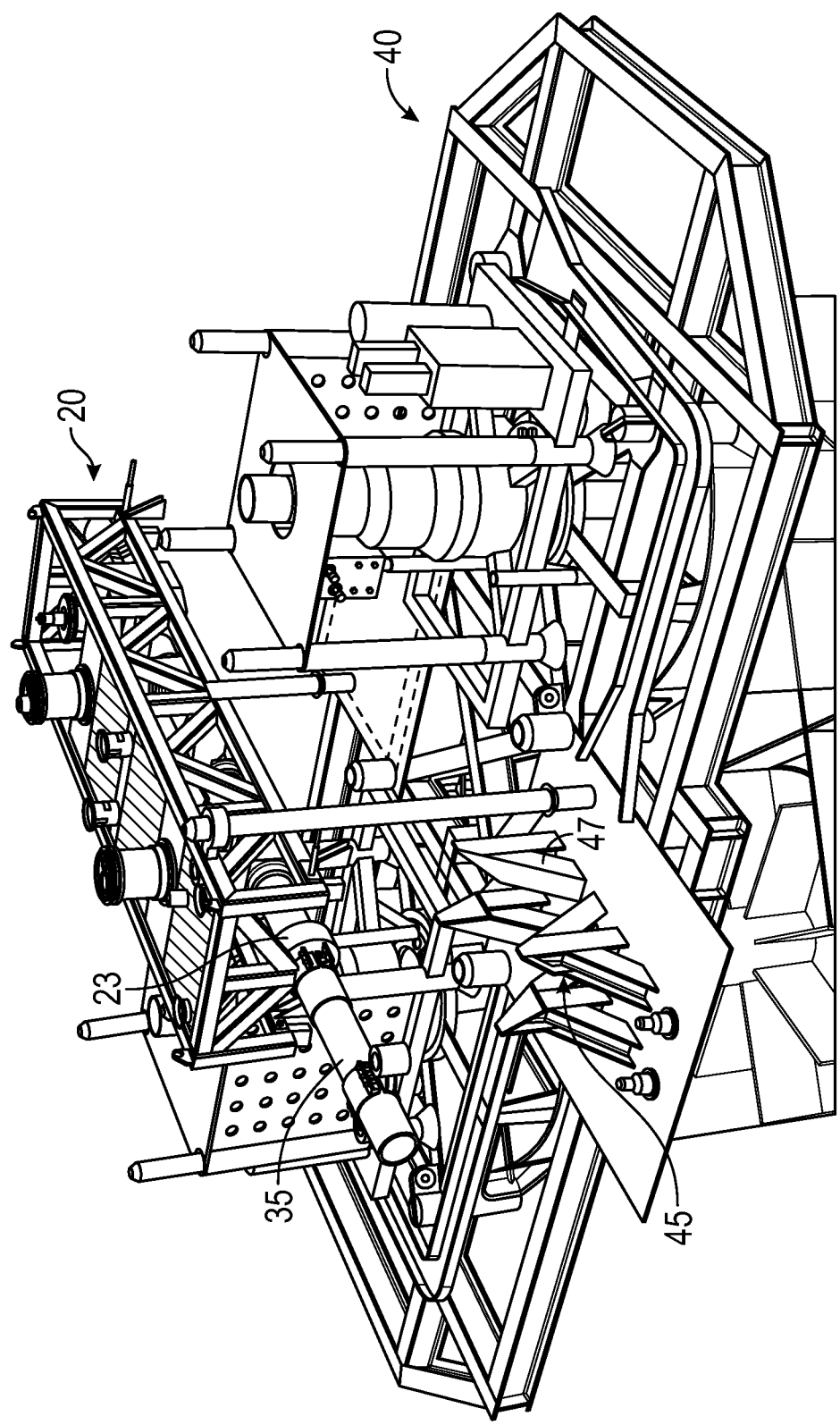
FIG. 8 is a perspective view of the manifold header and support frame of FIG. 5 being lowered into engagement with the subsea structure of FIG. 6.

FIG. 8 shows the manifold header assembly 20 being lowered towards the subsea platform 40. This is done in a similar manner to that described above with reference to FIG. 2; the manifold header 21 is provided in line with pipeline 35, which thus extends from opposite ends of manifold header 22. It will be appreciated that only a stub is shown in FIG. 8; in reality, the stub would extend along the seabed from another subsea platform and the opposite end would extend away and upwards to a pipe-laying vessel on the surface (i.e. leaving the upper-right part of the figure). The laying process will be described in more detail below.

It may be seen from FIG. 8 that the conical-faced forging 23 is generally aligned above jaws 47 of engagement cradle 45. As the manifold header assembly 20 continues to be lowered towards the platform 40, the forging 23 will be received by the open ends of the jaws 47 and because they are arranged in a V, this will assist in aligning the manifold header 21 correctly in its axial direction with respect to the platform. In addition, the frame 30 may be used to manipulate the manifold header 21 relative to the landing surface 44. Techniques similar to those discussed above in relation to the first design may be employed. In addition, winches may be used along with wire and ROV shackles to pull the pipeline to the correct position prior to fine alignment, which may be done by means of fine guide posts.

Figure 9:
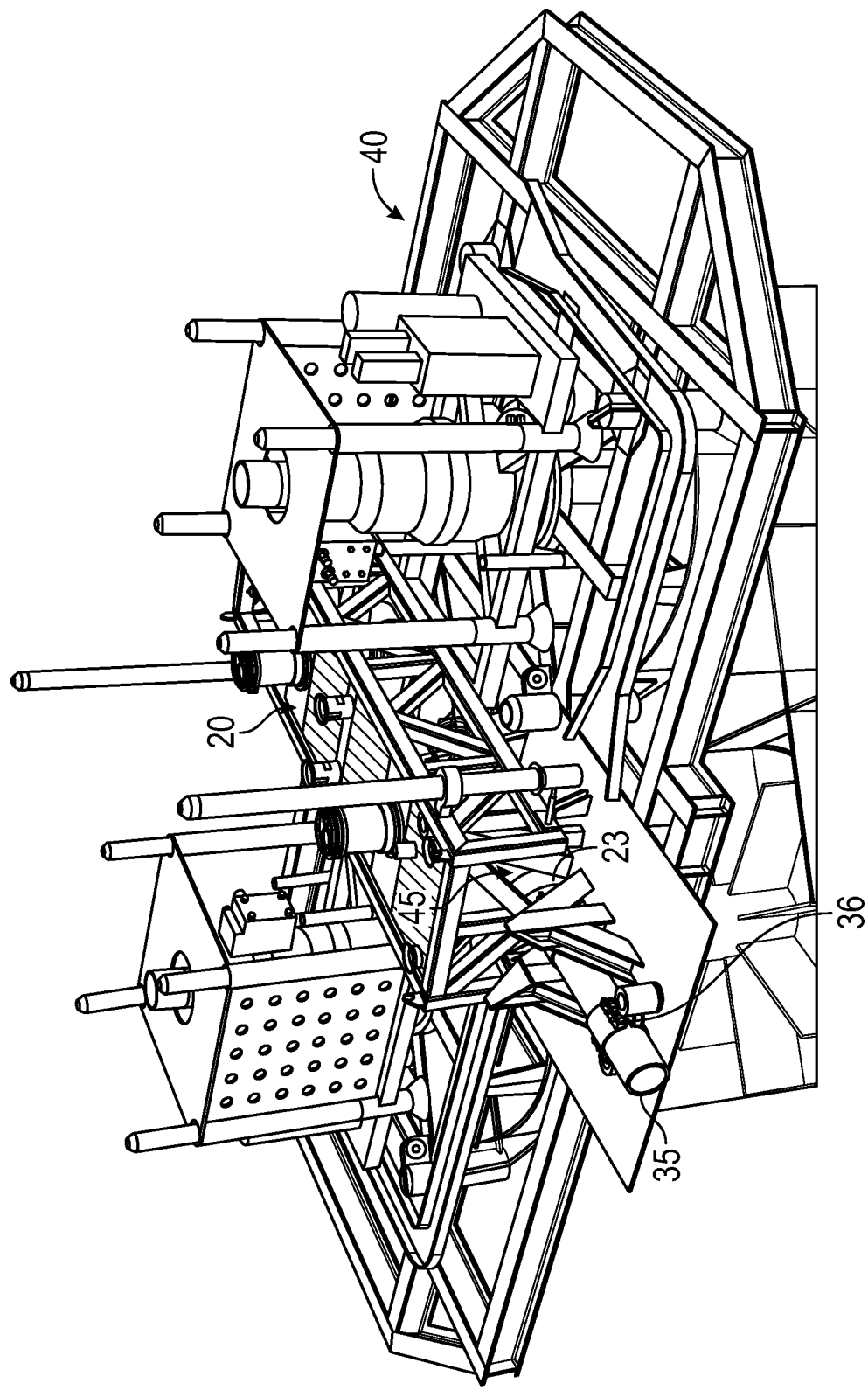
FIG. 9 is a perspective view corresponding to FIG. 5 showing the manifold header in engagement with the subsea structure.

FIG. 9 shows the manifold header assembly in its proper location with the support frame 30 abutting and anchored to the landing surface 44. It may be seen that the conical-faced forging is centrally located within the V-shaped jaws of engagement cradle 45. In addition, the pipeline 35 has been secured at opposite sides of the landing surface by means of clamp 36 and pins 48 (only the near-side attachment is visible). This serves to isolate the manifold header 21 from axial or torsional forces acting on the pipeline.

Once the manifold header assembly 20 has been secured in place, the valves 22 may be interconnected with the Xmas trees by mans of conduits such as choke bridges, as discussed in relation to the first design.

As has already been explained, the manifold header assembly 20 is provided in-line a pipeline 35. In fact, there will generally be a number of such assemblies provided along the length of a pipeline, each corresponding to a separate subsea structure to which they must be connected. The pipeline is laid by means of a surface vessel, with the manifold headers being connected (typically by welding) inline at the surface as the pipe is laid. It will be appreciated that for the manifold header assemblies to align with the subsea structures, they must be accurately located along the pipeline. However, this cannot be achieved to a tolerance of better than about one metre. It is therefore necessary to provide means whereby it is possible to adjust each manifold header, and hence the portion of pipeline to which it is attached, in the axial direction. The embodiment of the invention described below address this issue.

FIGS. 10 to 16 illustrate the steps involved in laying a pipeline having a number (two are shown) of manifold header sections which are interconnected to a corresponding number of subsea structures in which the pipeline is provided with a residual curvature (RC) section. The features of each figure correspond unless otherwise indicated.

Figure 10:
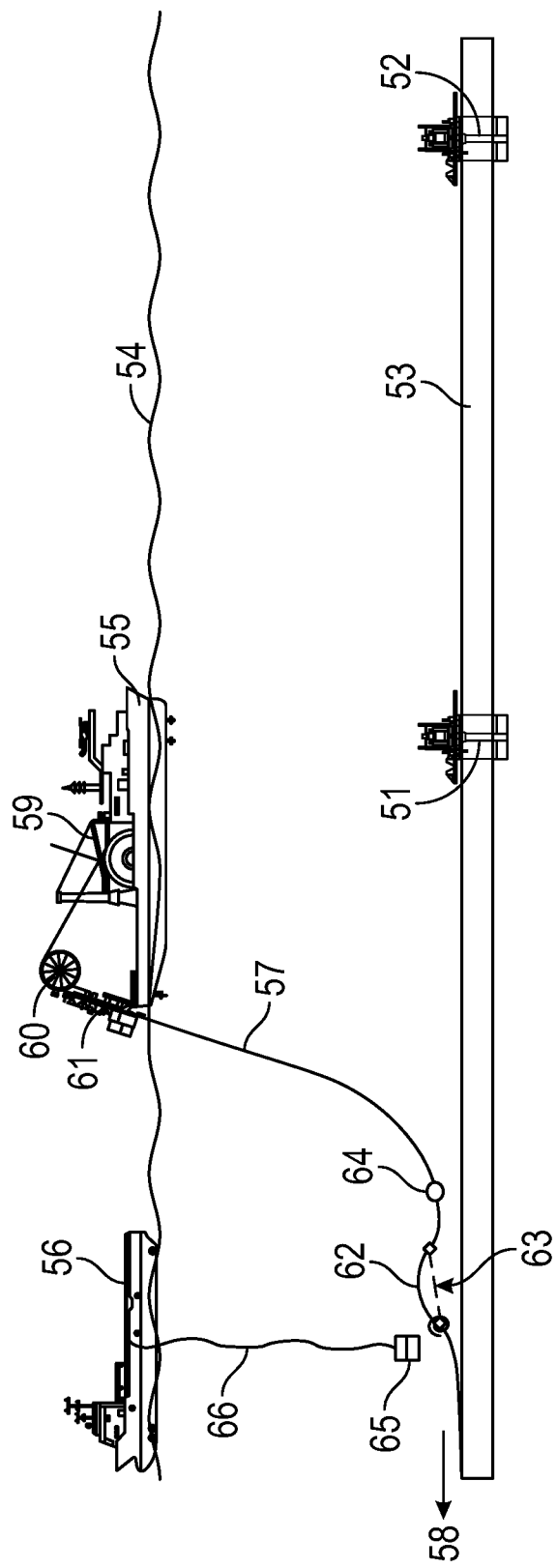
FIGS. 10 to 16 are schematic elevations showing a series of steps whereby a pipeline having a plurality of manifold headers being engaged with a plurality of subsea structures.

With reference to FIG. 10, two subsea structures, in this case suction anchors 51 and 52 have already been installed in the seabed 53. At the surface 54, a conventional pipeline-laying vessel 55 is accompanied by a second ROV-operating vessel 56 as it lays pipeline. The distal end of pipeline extends from a further subsea structure (not shown) in direction 58.

The pipeline-laying vessel has a store of pipeline on a reel. As the pipeline is unwound from the reel, it passes over wheel 60 and then downwardly through pipe straightener 61, in the well-known manner. However, at pre-determined locations, the pipe straightener is not used to straighten the pipeline such that a section 62 having residual curvature (RC) remains. In this figure, that section has almost reached seabed 53. In this case, in order to ensure that the section of residual curvature remains as required and can have its curvature adjusted as required, a wire tensioning system 63 is provided. This system is known per se from the Nystrom et al paper referenced in the introduction.

As will be discussed further below, the RC section should be located in the proper position. In order to allow the location of the RC section to be monitored, a transponder 64 is attached to the pipeline at a known distance from it. This may be monitored from the surface and/or via ROV 65, which is attached to vessel 56 by an umbilical 66. The ROV may also be used to adjust the RC wire tensioning system as desired. The tension in the pipeline should also be controlled.

Figure 11:
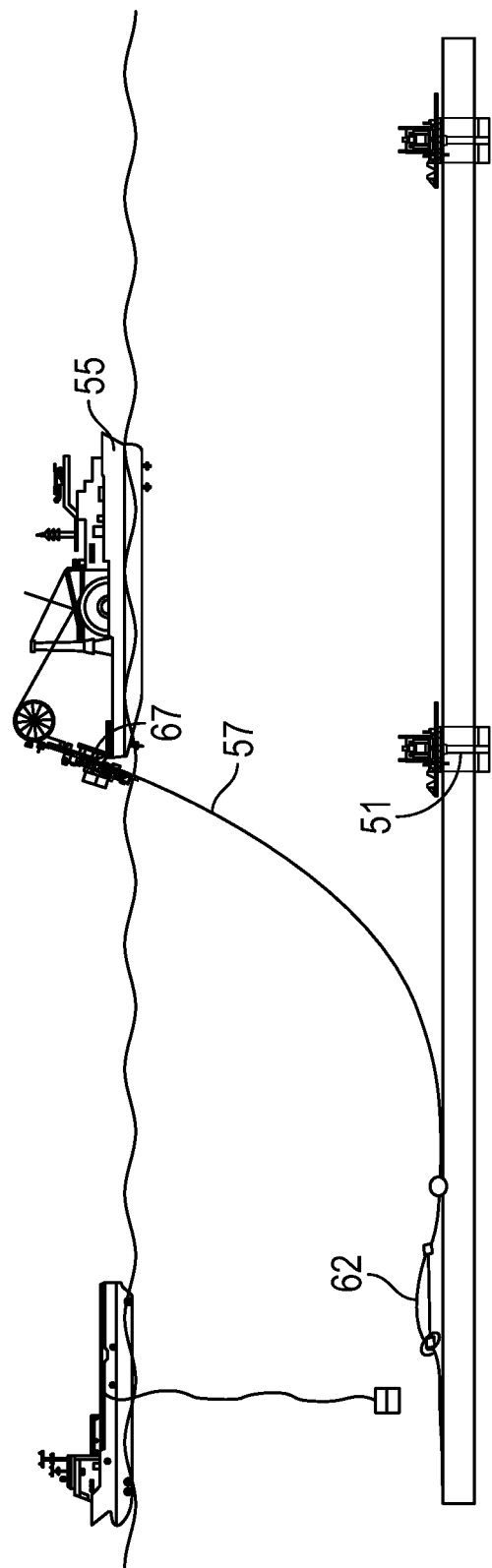

In FIG. 11, vessel 55 has moved to the right as shown and has extended and lowered more pipeline such that the RC section 62 now lies on the sea bed. The transponder position is monitored relative to the next suction anchor 51 in order to predict where the pipe should be cut and a manifold header installed inline.

A manifold header 67 (which may correspond to either previously described design) is shown being welded into the pipeline for interconnection with suction anchor 51. It will be noted that the manifold header 67 is located a considerable distance along the pipeline 57 from RC section 62. This is because the curvature of the RC section will initially be in the vertical plane (i.e. being bent around a notional horizontal axis), but the pipe will then tend to roll through about 90 degrees, such that the curved part of the pipe lies on the seabed. This will impart a torsional force to the end of the pipe which could tend to twist the manifold header into an improper orientation. Accordingly, RC section should have been located such that the manifold header need not be attached until sufficient pipeline has been extended and reached the seabed to allow the RC section to lie flat and there is no residual torsional force. This will generally require a straight length of pipe that is at least three times the water depth.

Figure 12:
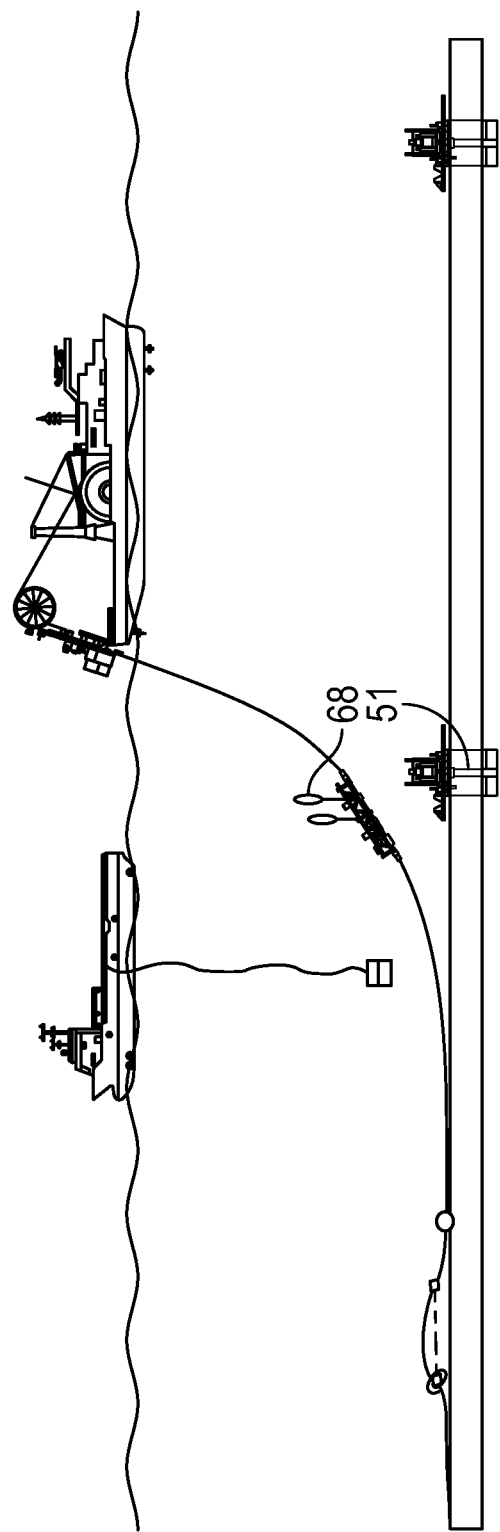

The manifold header 67 may have suitable buoyancy systems (e.g. inflatable bags) attached to it before it is lowered into the water. FIG. 12 shows the manifold header with such inflatable bags 68 as it is lowered towards suction anchor 51.

Figure 13:
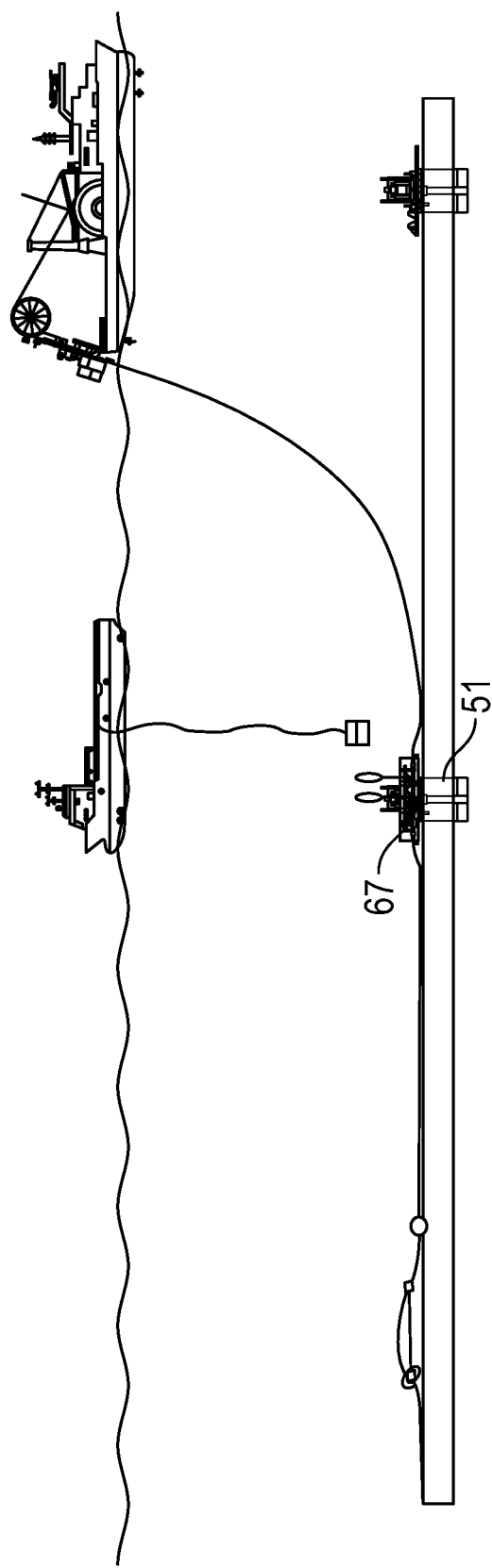

FIG. 13 shows the manifold header 67 installed at suction anchor 51 in the manner already described in relation to the two designs of manifold header and subsea structure. However, it should be noted that, because of the RC section, axial adjustment of the pipeline (and hence the manifold header) is facilitated because the effective length of the pipeline section may be varied, in this case by adjusting the wire tensioning system 63. Location information from the transponder may be used to assist in this process. Once properly located, the manifold header is securely clamped in position and the buoyancy may be removed.

Figure 14:
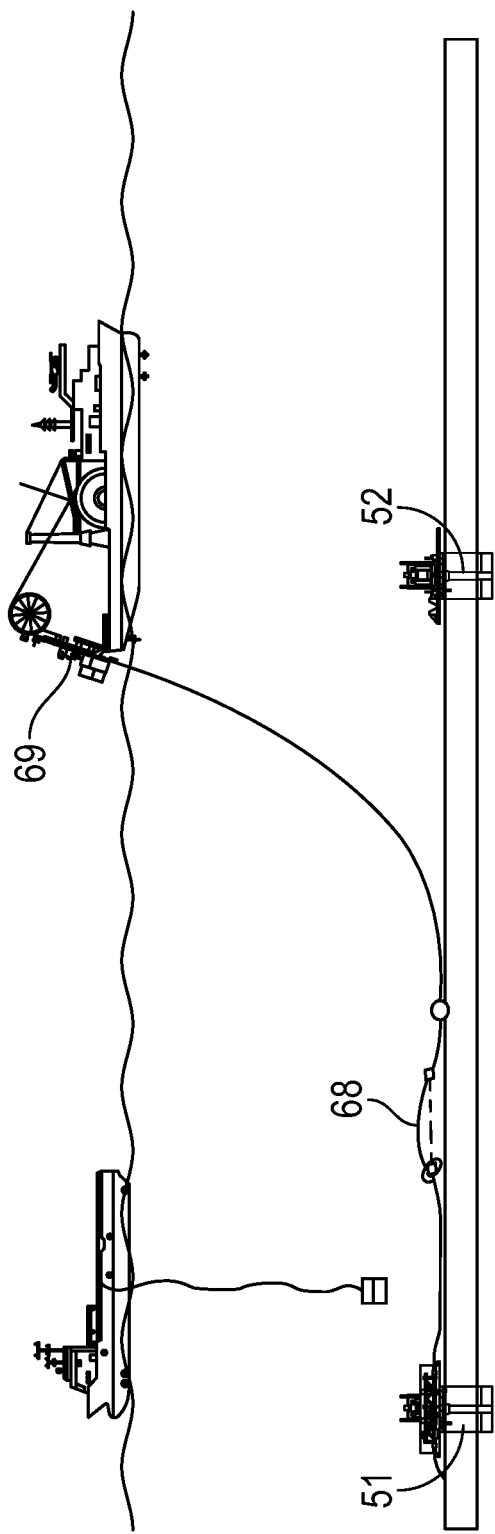
Figure 15:
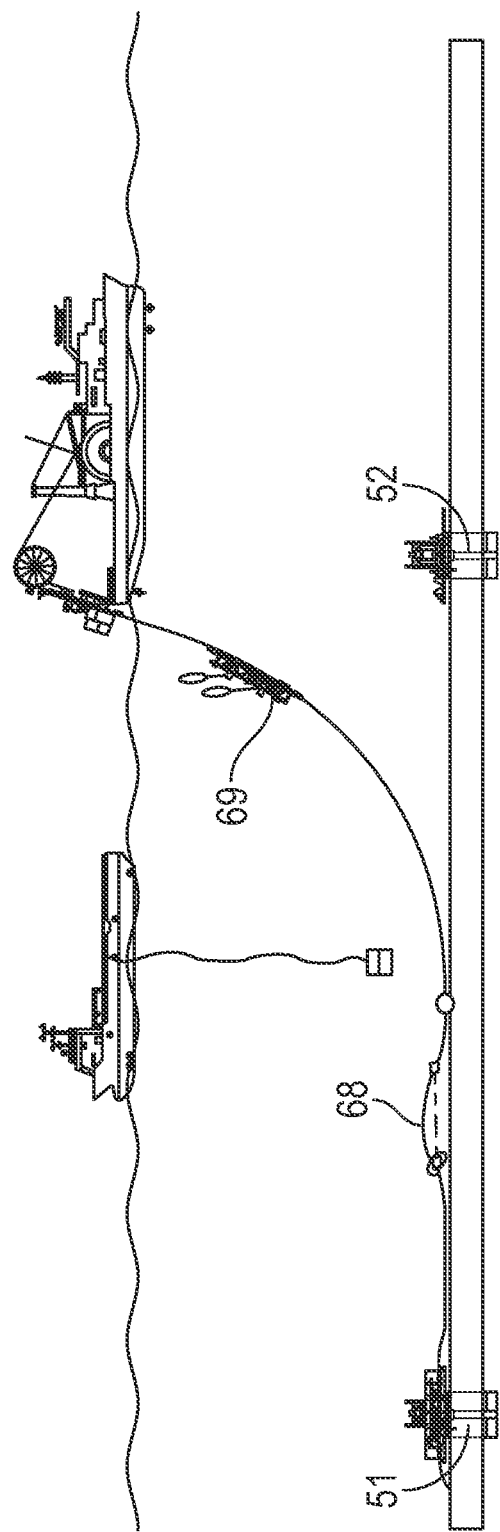

FIG. 14 shows a further RC section 68 that has been created in the same manner as that previously described to the right (as shown) of suction anchor 51. A further manifold header 69 is also shown being welded into place for interconnection with suction anchor 52. FIG. 15 then shows it being lowered to the seabed, also as previously described.

Figure 16:
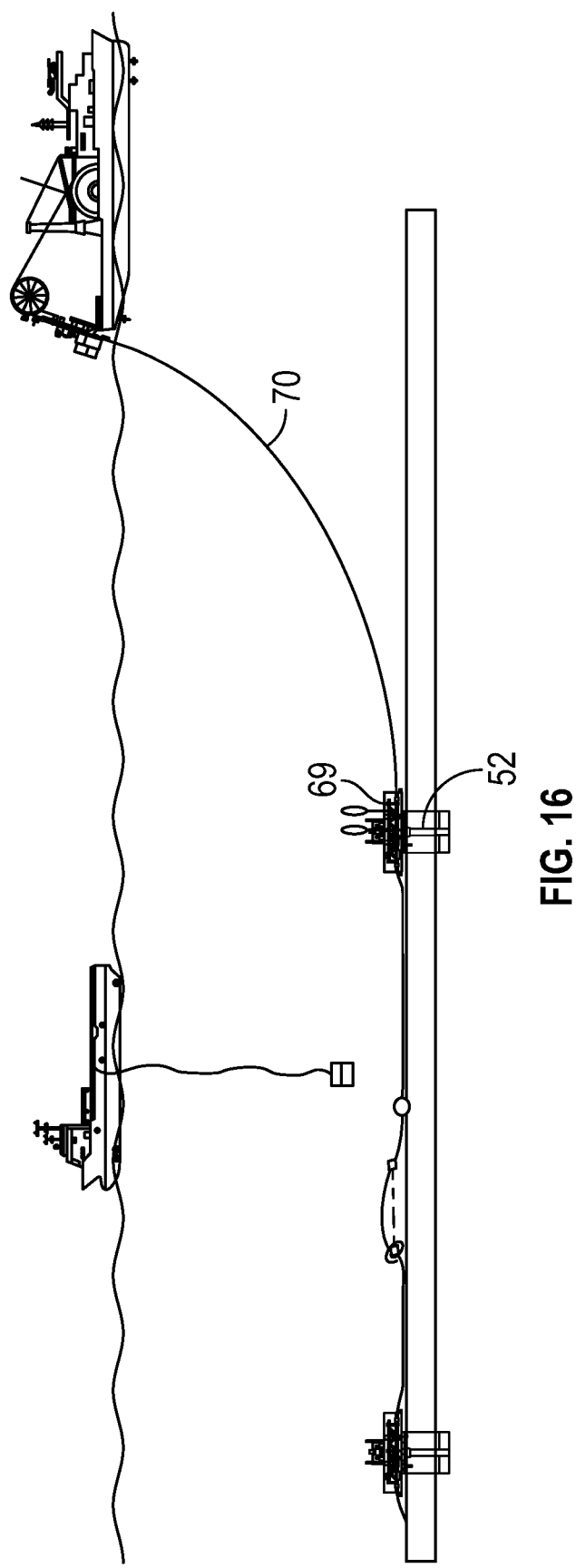

Finally, FIG. 16 shows manifold header 69 connected to suction anchor 52 having been installed in the previously-described manner. It will be noted that in this case there is no further pipeline extending to a further subsea structure. The pipeline is terminated at suction anchor 52 and so it was supported by A&R wire 70. This will be disconnected and recovered.

Figure 17:
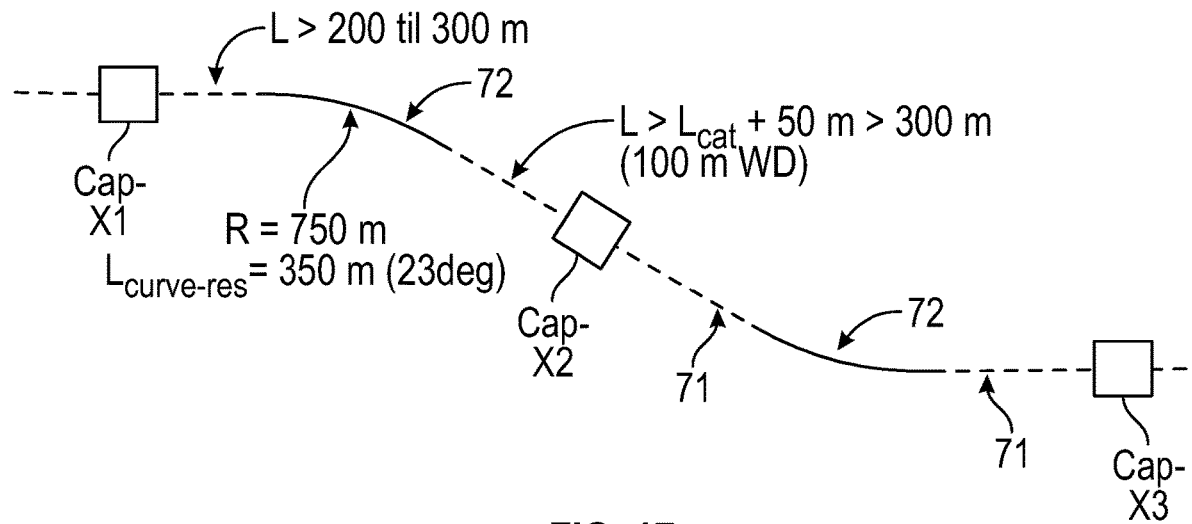
FIGS. 17 to 19 are schematic plan views showing alternative arrangements a pipeline having a plurality of manifold headers engaged with a plurality of seabed structures according to embodiments of the invention.
Figure 18:
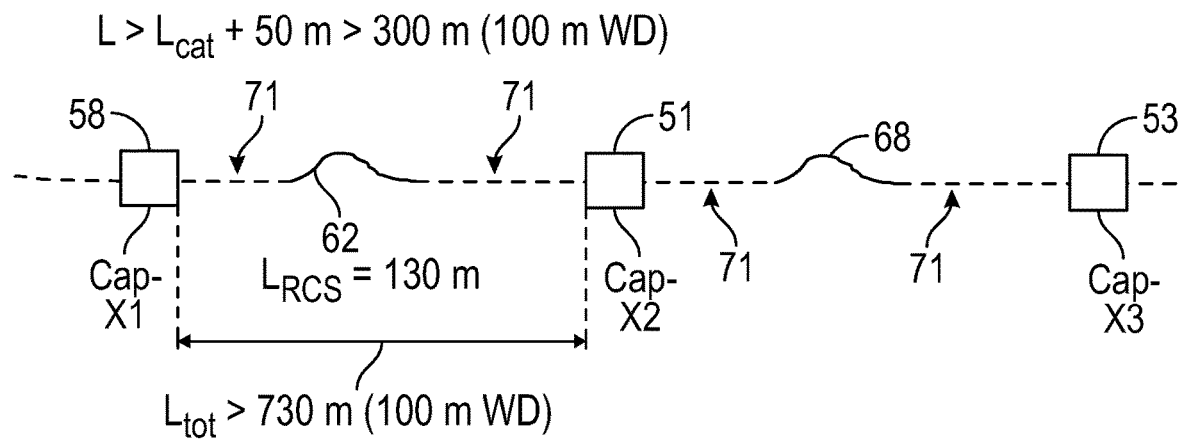
Figure 19:
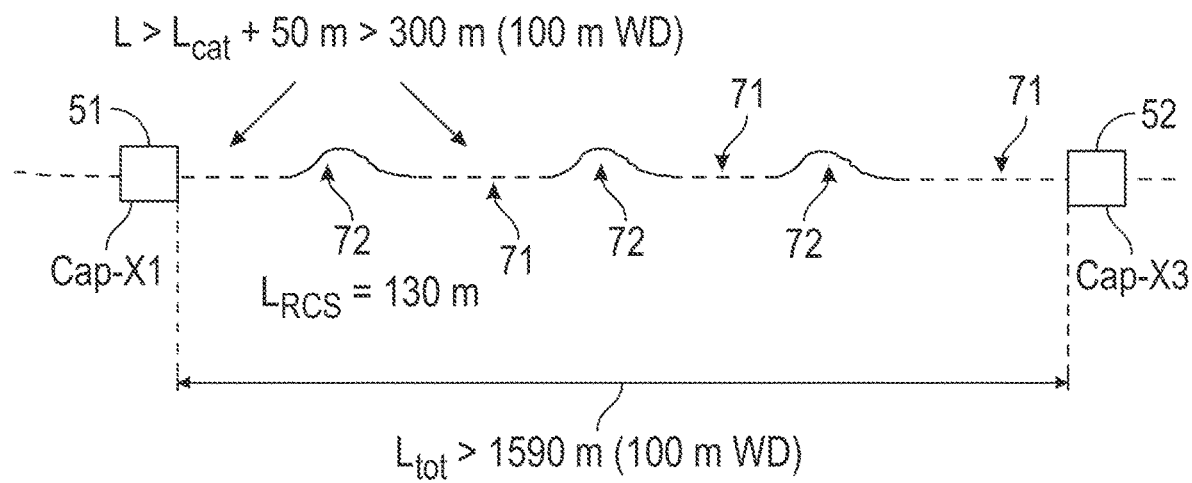

FIGS. 17 to 19 Illustrate schematically alternative methods of providing curvature in the pipeline to facilitate interconnection of an inline manifold header to a subsea structure.

Of these, FIG. 18 corresponds to the method just described with reference to FIGS. 10 to 16. Thus, there are shown three suction anchors, 58, 51 and 53 respectively and two RC sections, 62 and 68. The view is from above, so it may be seen that the RC sections are lying flat on the sea bed.

As discussed above with reference to FIG. 11, it is necessary to provide significant lengths of straight pipeline between the RC sections and the manifold headers to prevent torsional forces from rotating the manifold headers out of alignment with the subsea structures. These straight sections are identified by reference 71 in this figure. As discussed above, this distance should normally be at least three times the water depth to ensure that sufficient pipe is available on the sea bed to allow the RC section to lie flat before the manifold header is welded in place. In the present case, an exemplary water depth of 100 m is considered and an additional margin of 50 m is allowed. In the figure, $L_{cat}$ is the catenary length (i.e. the suspended length of pipe) and $L_{tot}$ is the distance between adjacent subsea structures. It will be appreciated that these figures provide minimum suitable distances between adjacent interconnected subsea structures. The straight sections can readily be increased in length as required. It also follows that, for the minimum distance between subsea structures, the RC section (or other curved section—see below) should be located mid-way between adjacent manifold headers.

FIG. 17 shows an alternative embodiment in which a single extended curve 72 is laid on the sea bed between each manifold header by altering the course of the pipeline-laying vessel, rather than by creating an RC section. In this case, rather than adjusting a tensioning system on an RC section, the pipeline may be straightened if pulled towards a subsea structure or the curvature may be increased more if pushed in the opposite direction. However, as with the RC section, the curved part 72 of the pipeline will tend to create a torsional force and so there should again be a similar length of straight pipe 71 between the curved section and the adjacent subsea structure.

In this example, the water depth is assumed to be 100 metres, so the straight pipe lengths are chosen to be 200 or preferably 300 metres long. However, the lengths chosen are dependent on the water depths, as will be discussed below.

The inventors have considered a range of curve radii and curve lengths in order to determine the most appropriate in terms of the optimum degrees of curvature versus the required force to pull the pipeline (i.e. to straighten the pipeline as required to enable the manifold header to be connected to the subsea structure). They have considered radii from 500 m to 1000 m and found that the force required increases with radius—in other words, it is preferable to use a smaller radius, to the extent that this is possible. However, they have also noted in each case that there is a dramatic drop in the pull-force required as the curve length increases from 100 to 200 metres, but very little drop beyond 400 metres. Thus, the curve should preferably be at least 150 metres and ideally over 200 metres, but less than 400 metres, with around 300 metres (say+/−50 m) being a preferred value.

FIG. 19 illustrates a further embodiment which is similar to that of FIG. 18, except that three RC sections 72 are provided between adjacent subsea structures 51 and 52. These are each spaced apart by straight sections 71. Here the water depth is again assumed to be 100 metres, so the 300 metre figure quoted (i.e. $3x$ water depth) is selected on which to base the straight pipeline lengths (an extra 50 metres being added in this case).

The inventors have studied the effects of different numbers of RC sections. They have noted that providing two RC sections between each manifold header reduces the pull-force required at the manifold header by approximately half under a wide range of conditions. Providing a further RC section makes a significant further improvement—i.e. to about a third of the force required with a single RC section—but using further RC sections provides diminishing returns. Thus, whilst providing four would further reduce the pull-force required, the improvement may not be justified, particularly if it were desired to locate subsea structures relatively close together. Accordingly, it is preferred to use two to four RC sections, with three being preferred.

A number of other, non-illustrated, embodiments may be used to provide the necessary additional length in the pipeline to allow for adjustment at the subsea structures. The pipeline may be laid over a structure such that it is lifted above the sea bed (the structure may subsequently be removed or adjusted as required). Another approach which would provide a similar result is to lift the pipeline from the sea bed by means of a crane operated from a surface vessel. The pipeline could either be attached to the crane via a sling or bespoke attachment point as it is lowered from the pipeline laying vessel, or it could be "fished" from the sea bed by means of a suitable grappling device.

A still further embodiment involves creating a horizontal curve on the sea bed by installing the pipe around a "counteract" on the sea bed, which may subsequently be removed. Any suitable structure may be used to form the counteract, providing it is able to provide the necessary lateral resistance.

Finally, it should be noted that the embodiments described above provide a further benefit in term of allowing the accommodation of thermal expansion of the pipeline which might otherwise result in buckling and hence serious damage.

The invention claimed is:

1. A method of interconnecting a conduit and a plurality of subsea structures, wherein the subsea structures are pre-installed on the sea bed, the method comprising:
   providing a first manifold header in-line of the conduit, the first manifold header comprising at least one valve installed therein;
   lowering a portion of the conduit to the sea bed;
   engaging the first manifold header with a first subsea structure with a locking mechanism to form a secure mechanical connection with the first subsea structure thereby preventing relative axial movement between the first manifold header and the first subsea structure;
   lowering a further portion of the conduit to the sea bed and providing a second manifold header in-line of the conduit, the second manifold header comprising at least one valve installed therein;
   engaging the second manifold header with a second subsea structure with a locking mechanism to form a secure mechanical connection with the second subsea structure thereby preventing relative axial movement between the second manifold header and the second subsea structure; and
   fluidly connecting the at least one valve of one or more of the first and second manifold headers with the respective subsea structure;

wherein a length of conduit provided on the sea bed between the first subsea structure and the second subsea structure is greater than a distance between the first and second subsea structures such that at least +/−0.5m of axial adjustment of the second manifold header relative to the subsea structure is enabled prior to engaging the second manifold header with the second subsea structure.

2. The method as claimed in claim 1, wherein the length of the conduit is such that at least +/−1m of axial adjustment of the second manifold header relative to the second subsea structure is enabled.

3. The method as claimed in claim 1, wherein the length of conduit between the first subsea structure and the second subsea structure comprises first and second straight sections and a curved section between the straight sections.

4. The method as claimed in claim 3, wherein the straight sections have a length of at least three times a water depth.

5. The method as claimed in claim 3, wherein the straight sections are at least 150 metres in length.

6. The method as claimed claim 1, wherein a residual curvature section (as defined herein) is provided in the conduit between the first and second subsea structures.

7. The method as claimed in claim 6, wherein a plurality of residual curvature sections are provided.

8. The method as claimed in claim 1, wherein a curved section of pipe is laid on the seabed.

9. The method as claimed in claim 8, wherein counteracts are provided on the sea bed around which the section of pipe is curved.

10. The method as claimed in claim 1, wherein the conduit is curved in a vertical direction.

11. The method as claimed in claim 1, further comprising axially adjusting a position of the second manifold header before securing the second manifold header in position.

12. The method as claimed in claim 1, wherein the step of engaging one or more of the first and second manifold header comprises engaging a conical portion thereof with a V-shaped or tapered cradle.

13. The method as claimed in claim 1, wherein the conduit is a subsea pipeline or subsea spool.

14. The method as claimed in claim 1, wherein the conduit is a rigid pipeline.

15. The method as claimed in claim 1, wherein the one or more of the first and second subsea structures comprises a wellhead to which the at least one valve of the respective manifold header is connected.

16. The method as claimed in claim 15, wherein vertical- or horizontal adjustment of the at least one valve providing fluidic connection to the wellhead is enabled.

17. The method as claimed in claim 1, wherein one or more of the first and second subsea structures comprises one or more suction anchors or a mudmat.

18. The method as claimed in claim 1, wherein the second manifold header is not connected inline until a preceding curved section of pipeline has been laid on the sea bed.

19. The method as claimed in claim 1, wherein the first manifold header in-line of the conduit, the second manifold header in-line of the conduit, and curved section(s) exist along the pipeline as the pipeline is laid from the seabed and up a pipe-laying vessel.

20. The method as claimed in claim 1, wherein the first manifold header and/or the second manifold header comprises one or a plurality of vertical or horizontal connectors, either single- or multi-bore.

21. A subsea system comprising a conduit at the seabed and a plurality of subsea structures comprising:
  a first manifold header in-line of the conduit, the first manifold header comprising at least one valve installed therein and being engaged with a first subsea structure with a locking mechanism thereby preventing relative axial movement between the first manifold header and the first subsea structure;
  a second manifold header in-line of the conduit, the second manifold header comprising at least one valve installed therein and being engaged with a second subsea structure with a locking mechanism thereby preventing relative axial movement between the second manifold header and the second subsea structure;
  wherein the at least one valve of one or more of the first and second manifold headers is fluidly connected with the respective subsea structure;
  wherein a length of conduit provided on the sea bed between the first subsea structure and the second subsea structure is greater than a distance between the first and second subsea structures such that at least +/−0.5m of axial adjustment of the second manifold header relative to the second subsea structure is enabled prior to engaging the second manifold header with the second subsea structure.

* * * * *